(12) United States Patent  (10) Patent No.: US 7,784,500 B2
Hirahara  (45) Date of Patent: Aug. 31, 2010

(54) SYSTEM AND METHOD FOR FILLING A SEEDCOAT WITH A LIQUID TO A SELECTED LEVEL

(75) Inventor: Edwin Hirahara, Federal Way, WA (US)

(73) Assignee: Weyerhaeuser NR Company, Federal Way, WA (US)

( * ) Notice: Subject to any disclaimer, the term of this patent is extended or adjusted under 35 U.S.C. 154(b) by 0 days.

(21) Appl. No.: 12/546,553

(22) Filed: Aug. 24, 2009

(65) Prior Publication Data

US 2009/0314381 A1 Dec. 24, 2009

Related U.S. Application Data

(62) Division of application No. 10/985,217, filed on Nov. 9, 2004, now Pat. No. 7,591,287.

(60) Provisional application No. 60/531,558, filed on Dec. 18, 2003.

(51) Int. Cl.
*B65B 31/00* (2006.01)

(52) U.S. Cl. .............................. 141/8; 141/95; 141/126

(58) Field of Classification Search ................. 141/2, 141/4–8, 57, 94, 95, 116, 120, 126; 422/99–104; 47/57.6; 73/863.01
See application file for complete search history.

(56) References Cited

U.S. PATENT DOCUMENTS

| | | | | | |
|---|---|---|---|---|---|
| 2,660,350 A | * | 11/1953 | Fechheimer | ................. | 141/1 |
| 2,784,748 A | * | 3/1957 | Eichenlaub | ................. | 141/65 |
| 2,822,830 A | * | 2/1958 | Grosbois | ................. | 141/59 |
| 3,318,345 A | * | 5/1967 | Beall, Jr. | ................. | 141/59 |
| 4,467,843 A | * | 8/1984 | Holmqvist et al. | ................. | 141/1 |
| 4,516,702 A | * | 5/1985 | Schmidt | ................. | 222/514 |
| 4,621,665 A | * | 11/1986 | Webb | ................. | 141/1 |
| 5,193,403 A | * | 3/1993 | Burgisser | ................. | 73/864.17 |
| 5,474,113 A | * | 12/1995 | Rademacher et al. | ................. | 141/31 |
| 6,627,157 B1 | * | 9/2003 | Doktycz et al. | ................. | 422/100 |
| 7,591,287 B2 | * | 9/2009 | Hirahara | ................. | 141/2 |

* cited by examiner

*Primary Examiner*—Timothy L Maust
(74) *Attorney, Agent, or Firm*—Christensen O'Connor Johnson Kindness PLLC

(57) ABSTRACT

A fluid dispensing system includes a fluid dispensing pump interchangeably connected to a fluid dispensing pump manipulator that is capable of translating the fluid dispensing pump between two known positions along the Z-axis, and at least one open ended container, such as a seedcoat, disposed below the fluid dispensing pump for receiving fluid therefrom. The fluid dispensing system further includes a controller. The controller 30 sends control signals for automating the fluid dispensing process.

7 Claims, 13 Drawing Sheets

SYSTEM AND METHOD FOR FILLING A SEEDCOAT WITH A LIQUID TO A SELECTED LEVEL

CROSS REFERENCE TO RELATED APPLICATION

The present application claims the benefit of U.S. Provisional Application Ser. No. 60/531,558, filed Dec. 18, 2003 and U.S. Nonprovisional application Ser. No. 10/985,217 filed Nov. 9, 2004. The present application is a division of U.S. Nonprovisional application Ser. No. 10/985,217 and claims the benefit of the prior application under 35 U.S.C. 121 and 37 CFR 1.53(b).

FIELD OF THE INVENTION

The present invention relates to fluid dispensing systems, and particularly, to systems and methods for dispensing liquid into a container, such as a manufactured seedcoat.

BACKGROUND OF THE INVENTION

Modern agriculture, including silviculture, often requires the planting of large numbers of substantially identical plants genetically tailored to grow optimally in a particular locale or to possess certain other desirable traits. Production of new plants by sexual reproduction can be slow and is often subject to genetic recombinational events resulting in variable traits in its progeny. As a result, asexual propagation has been shown for some species to yield large numbers of genetically identical embryos, each having the capacity to develop into a normal plant. Such embryos must usually be further cultured under laboratory conditions until they reach an autotrophic "seedling" state characterized by an ability to produce their own food via photosynthesis, resist desiccation, produce roots able to penetrate soil and fend off soil microorganisms.

Some researchers have experimented with the production of artificial seeds, known as manufactured seeds, in which individual plant somatic or zygotic embryos are encapsulated in a seedcoat, such as those disclosed in U.S. Pat. No. 5,701,699, issued to Carlson et al., the disclosure of which is hereby expressly incorporated by reference.

Typical manufactured seeds include a seedcoat, a synthetic gametophyte and a plant embryo. Typically, the seedcoat is a capsule having a closed end and an open end. The synthetic gametophyte is placed in its liquid phase within the seedcoat, such that the gametophyte substantially fills the seedcoat. A cotyledon restraint may then be centrally located within the synthetic gametophyte. The cotyledon restraint includes a centrally located cavity extending partially through the length of the cotyledon restraint and sized to receive the plant embryo therein. The plant embryo is subsequently deposited within the cavity of the cotyledon restraint cotyledon end first. The plant embryo is typically sealed within the seedcoat by at least one end seal.

While prior manufacturing methods have been successful in producing manufactured seeds, the process is not without its problems. For example, one problem that currently exists occurs during the gametophyte filling stage. When filling the seedcoat with gametophyte, it is necessary to leave an appropriately sized space or gap between the surface level of the gametophyte and the top edge of the seedcoat. This space enables a sufficient seal to be formed at the end of the seedcoat, for example, by a quantity of wax, subsequent to the placement of the plant embryo.

However, it has been recognized by the inventor of the present invention that the space or gap formed between the surface level of the gametophyte and the top edge of the container after filling the seedcoat with a predetermined quantity of gametophyte using the prior art process varies from seedcoat to seedcoat, often causing an insufficient space to properly seal the end of the seedcoat. This variation in the amount of space left unoccupied at the top of the seedcoat during the filling stage is due, in particular, to inconsistencies in the manufacturing process of the seedcoat. Specifically, the seedcoats are made from tubular material whose inner diameter is not precisely controlled during the manufacturing process. When using this tubular material for making manufactured seedcoats, the tubular material is cut to precise lengths. To form a seedcoat from the cut-to-length tubular material, one end is closed, either by wax or a mechanical crimping process. Because the seedcoats have varying inner diameters and a consistent length, the volume of each seedcoat varies. Thus, using a predetermined quantity of gametophyte for each seedcoat as currently done in the prior art process sometimes causes an inaccurate level of gametophyte within a certain number of manufactured seeds, which in turn, may cause an insufficient space between the gametophyte surface and the top edge of the container. This may potentially result in improperly sealed manufactured seeds, which is costly in commercial applications.

SUMMARY OF THE INVENTION

The present invention is directed to an fluid dispensing system that addresses the deficiencies of the prior art and others by employing several alternative devices in a system that fills the seedcoats with a precise or selected level of fluid, such as gametophyte, for allowing a proper seal to be formed at the end of the seedcoat. As will be described below, these devices may also by used in dispensing a precise or selected level of wax to seal an end of the seedcoat.

In accordance with aspects of the present invention, a method for filling a container with a fluid to a selected level is provided. The container defines an open ended cavity. The method includes dispensing fluid into the container for filling the container to a second level of fluid that exceeds the selected level and removing a quantity of fluid from the container substantially equal to the amount of fluid that exceeds the selected level.

In accordance with another aspect of the present invention, a method for filling a seedcoat with a fluid to a selected level is provided. The seedcoat defines an open ended cavity. The method includes placing a discharge port of a fluid dispensing device within the open ended cavity at a selected position associated with the selected level and dispensing fluid from the discharge port into the seedcoat to fill the seedcoat with a second level of fluid that exceeds the selected level. A quantity of fluid is then removed from the seedcoat by the discharge port substantially equal to the amount of fluid that exceeds the selected level.

In accordance with still another aspect of the present invention, a method of filling one of the containers in the system with fluid to a selected level is provided. The system includes a fluid discharge and removal device, a linear actuator for moving the device along a Z-axis, and a plurality of open ended containers supported thereon. The method includes inserting a discharge orifice of the device into one of the open ended containers to a position associated with the selected level and dispensing a measured quantity of fluid from the discharge orifice into the container. The measured quantity exceeds the selected level when contained by the container. A second quantity of fluid is then removed from the dispensed measured quantity with the device, the second quantity of fluid being substantially equal to an amount of fluid that exceeds the selected level.

In accordance with yet another aspect of the present invention, a system is provided for filling at least one container with fluid to a selected level. The system includes a container defining an open ended cavity and a fluid dispensing and removal device aligned with the open ended cavity of the container. The device dispenses a first quantity of fluid into the container that exceeds the selected level and removes a second quantity of fluid to reduce the dispensed fluid to about the selected level. The system further includes a fluid source conditionally connected in fluid communication with the device.

BRIEF DESCRIPTION OF THE DRAWINGS

The foregoing aspects and many of the attendant advantages of this invention will become more readily appreciated by reference to the following detailed description, when taken in conjunction with the accompanying drawings, wherein.

DETAILED DESCRIPTION OF THE PREFERRED EMBODIMENT

The present invention will now be described with reference to the accompanying drawings where like numerals correspond to like elements. The present invention is directed to fluid dispensing systems and methods for filling an open ended container with a liquid. Specifically, the present invention is directed to fluid dispensing systems and methods for dispensing a precise, selected level of liquid into a container. The use of the terms "precise level", "sufficient level", and "selected level" herein is not meant to connote any particular volume per se, but instead to connote a specific level or range of levels that creates a sufficient gap or space between the fluid surface and the top edge of the container for providing favorable conditions to achieve a proper seal. While the present invention is explained below and illustrated herein for use with seedcoats for manufactured seeds, it will be appreciated that aspects of the present invention may be utilized to precisely fill other containers with a selected level of liquid. Accordingly, the following descriptions and illustrations herein should be considered illustrative in nature, and not limiting the scope of the present invention, as claimed.

Figure 1:
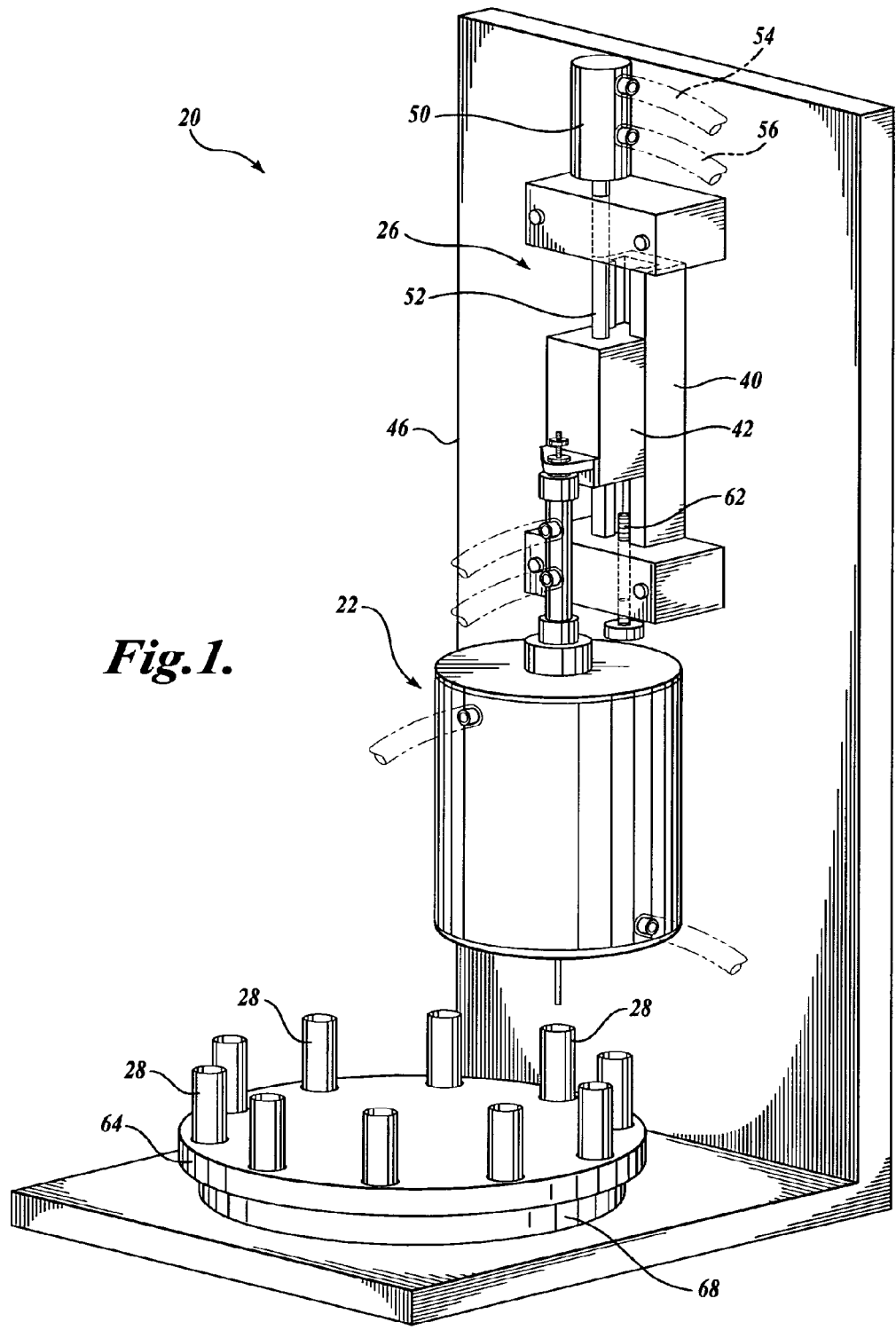
FIG. 1 is a perspective view of a fluid dispensing system constructed in accordance with aspects of the present invention.

FIG. 1 is a perspective view of a representative embodiment of a fluid dispensing system, generally designated 20, constructed in accordance with principles of the present invention. The system 20 includes a fluid dispensing pump 22 interchangeably connected to a fluid dispensing pump manipulator 26 that is capable of translating the fluid dispensing pump 22 between two known positions along the Z-axis, and at least one open ended container 28, such as a seedcoat, disposed below the fluid dispensing pump 22 for receiving fluid therefrom. The fluid dispensing system 20 further includes a controller 30, as best shown in the block diagram of FIG. 13. The controller 30 sends control signals for automating the fluid dispensing process.

Figure 4:
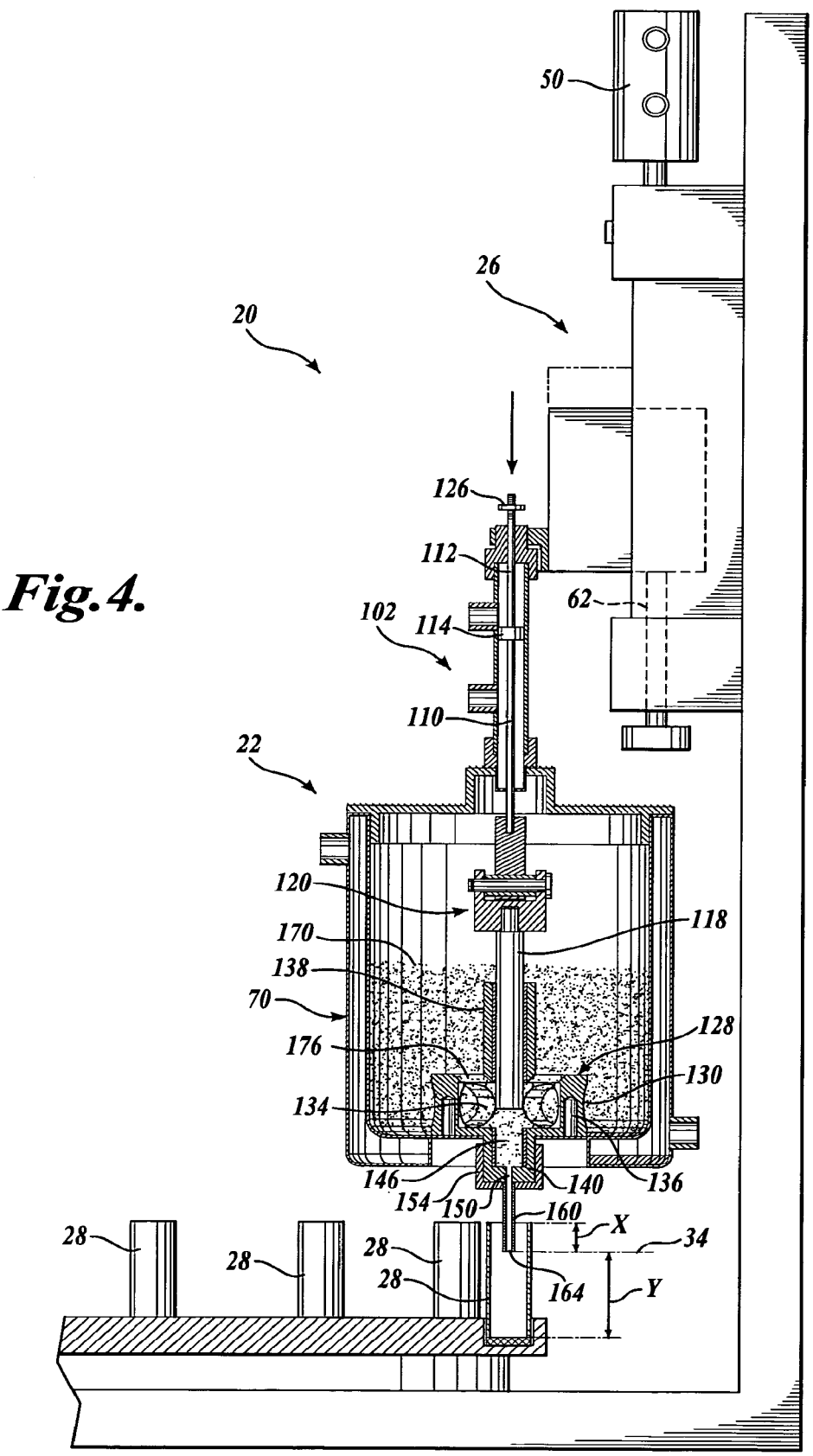
FIG. 4 is a partial cross-section view of the fluid dispensing system shown in FIG. 1, depicting the fluid dispensing pump in the lowered position and the plunger in the retracted position.
Figure 5:
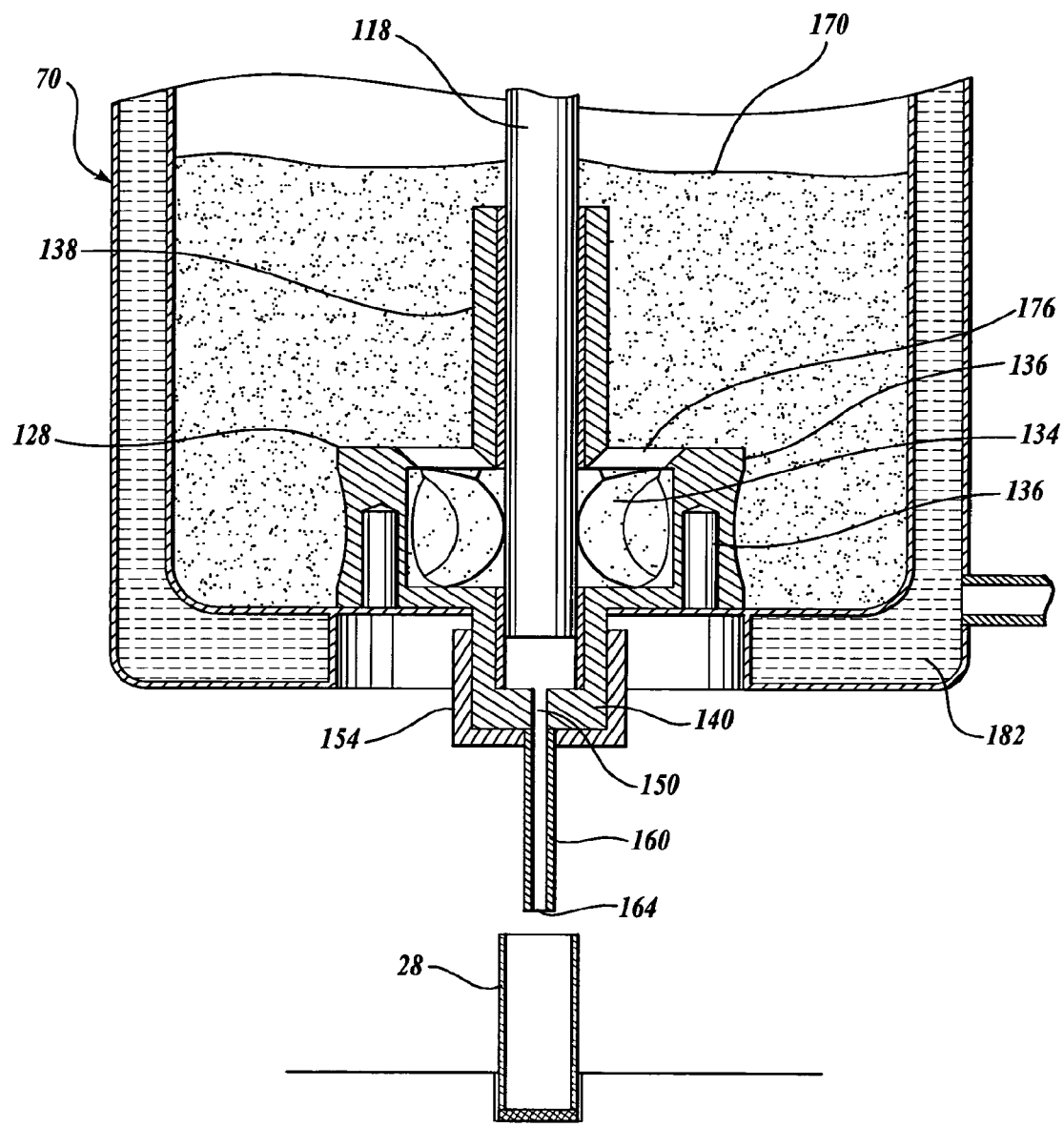
FIGS. 5-10 are sequential views of the operation of the fluid dispensing system that fills a container with fluid to a selected level.

In operation, the fluid dispensing pump 22 is lowered by the fluid dispensing pump manipulator 26 until the discharge orifice 164 of the fluid dispensing pump 22 is disposed within the opening of the container 28 and positioned at a selected level 34, which is defined as a distance X below the top edge of the container 28 and a distance Y above the bottom surface of the container 28, as best shown in FIG. 4. The fluid dispensing pump 22 discharges a repeatable metered quantity of fluid into the container 28, which purposefully exceeds the selected level 34. After the fluid dispensing pump 22 discharges the fluid into the container 28 to exceed the selected level 34, the fluid dispensing pump 22 removes that amount of fluid currently present within the container 28 that exceeds the selected level 34 so that the desired space or gap formed between the surface of the fluid and the top opening of the container is achieved. The fluid dispensing pump 22 is then raised by the fluid dispensing pump manipulator 26 and another container 28 of like or similar size may be moved into position, either manually or in an automated process, for receiving a discharge of fluid.

Figure 13:
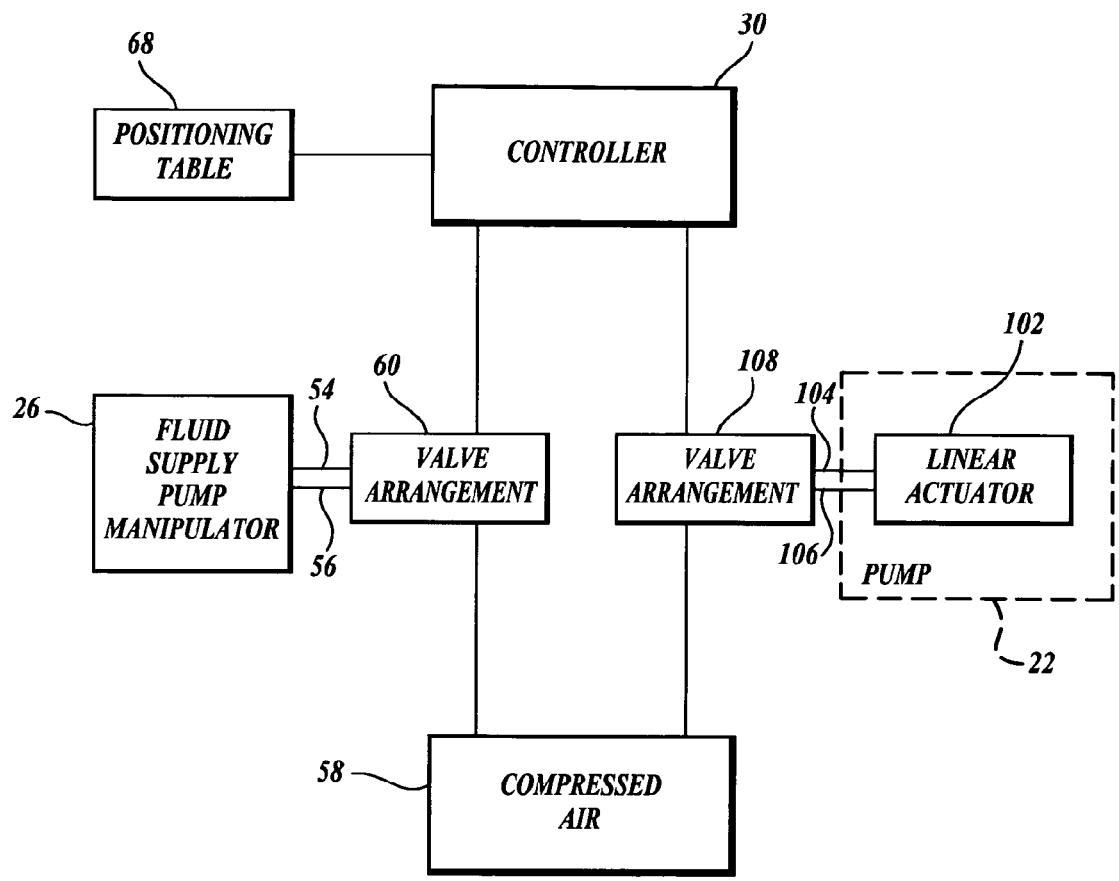
FIG. 13 is a block diagram depicting the components of the fluid dispensing system shown in FIG. 1.

Referring back to FIG. 1, the fluid dispensing pump manipulator 26 includes a track base 40 on which a reciprocating block 42 guidably moves in a reciprocating manner. The fluid dispensing pump manipulator 26 is fixedly secured to a support structure, such as frame 46, in an orientation such that the block 42 moves substantially parallel with the Z-axis. The block 42 may be electrically or mechanically driven as known in the art, and controlled by the controller 30 (See FIG. 13). In the embodiment shown, the fluid dispensing pump manipulator 26 is mechanically driven by a conventional pneumatic cylinder 50 having a reciprocating member 52 and fluid conduits 54 and 56. As best shown in FIG. 13, a conventional source of pressurized air 58 and a conventional valve arrangement 60 are connected to the fluid conduits 54 and 56 in a conventional manner for effecting movement on the block 42, and in turn, the fluid dispensing pump 22, between the positions shown in FIGS. 3 and 4, as will be described in detail below. The valve arrangement 60 is further connected in electrical communication with the controller 30 in a manner known in the art for receiving control signals therefrom.

For reasons that will be discussed in more detail below, the fluid dispensing pump manipulator 26 includes an adjustable end stop 62 for mechanically determining the lowered position of the block 42, and thus, the fluid dispensing pump 22, shown best in FIG. 4. The end stop 62 may be a threaded fastener, as shown, or other device that provides an adjustably positioned contact surface along the Z-axis. In applications where the fluid dispensing pump manipulator 26 includes an electric driving mechanism, such as a servo or stepper motor or a solenoid, the end position of the reciprocating block 42 may be selected and programmed into the controller by the operator utilizing techniques well known in the art. As such, it will be appreciated that multiple end positions may be stored by controller memory when utilizing electrically driven linear actuators so that multiple applications may be achieved without reprogramming the controller.

Returning to FIG. 1, the system 20 also includes at least one container 28 for receiving fluid from the fluid dispensing pump 22. In the embodiment shown, a plurality of container 28, such as manufactured seedcoats, are placed within a receptacle tray 64 in a spaced apart manner and oriented vertically such that the axes of their openings are parallel with the Z-axis. The receptacle tray 64 may placed upon a conventional rotational positioning table 68 capable of receiving control signals from the controller 30 for sequentially indexing the containers 28 into a repeatable, desired location for receiving fluid from the fluid dispensing pump 22. It will be appreciated that the containers 28 may be arranged in a matrix, instead of annularly as shown, and manipulated into the fluid receiving position by a conventional X-Y positioning table, if desired.

Figure 2:
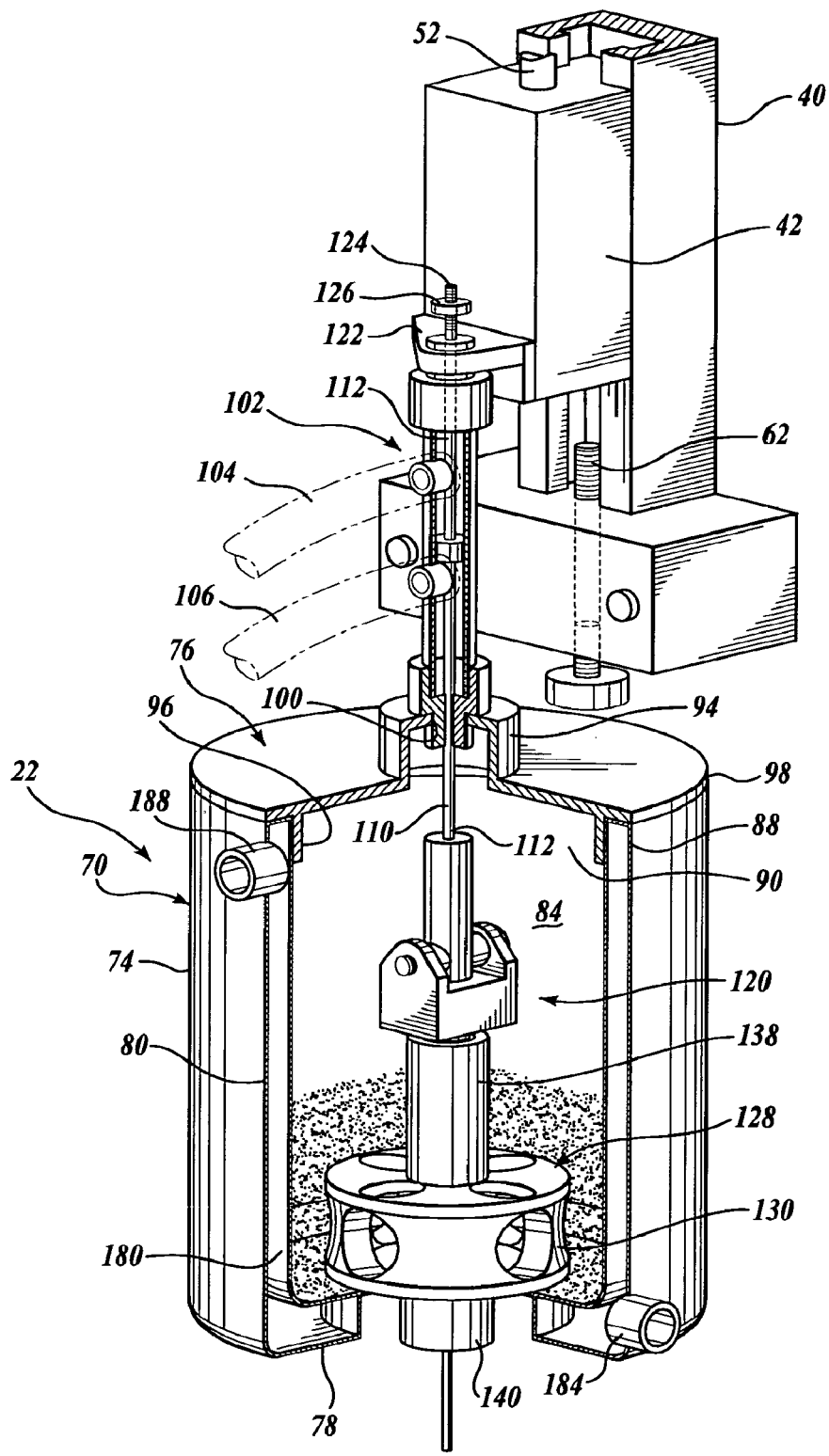
FIG. 2 is a perspective view of the fluid dispensing pump and fluid dispensing pump manipulator of the fluid dispensing system shown in FIG. 1.

Referring to FIG. 2, the components of the fluid dispensing pump 22 will now be described in turn. The fluid dispensing pump 22 includes a housing 70 formed of a base 74 and an end cap 76. The base 74 includes a bottom wall 78 and upwardly extending sidewalls 80 that extend around the perimeter of the bottom wall 78, thereby defining a cavity 84. The side walls 80 terminate in a rim section 88 that defines a top opening 90 for providing access to the cavity 84. The end cap 76 includes a centrally located boss 94 and a flange 96 that extends around the perimeter of the end cap 76 a spaced distance inward from the edge 98 thereof. The flange 96 is sized and configured to be received within the top opening 90 of the cavity 84 and engage the rim section 88 in a sealable manner. The end cap 76 may be selectively connected to the base 74 for sealing the cavity 84 using various techniques known in the art. For example, the flange 96 of the end cap 76 may be sized and configured to engage the sidewalls 80 of the base 74 in a slight press fit manner, or the flange 96 may be externally threaded to threadably engage cooperating internal threads (not shown) formed in the sidewalls 80 of the base 74.

The boss 94 of the end cap 76 includes a centrally located aperture 100 to which one end of a linear actuator 102 is attached. The linear actuator 102 may be any presently known or future developed linear actuator that is electrically or mechanically driven. In the embodiment shown, the linear actuator 102 is of the conventional pneumatic piston/cylinder type having fluid conduits 104 and 106 and reciprocally movable lower and upper shafts 110 and 112 connected on either side of a piston 114. The fluid conduits 104 and 106 are connected in a conventional manner to a conventional source of pressurized air 58 (See FIG. 13) and a conventional valve arrangement 108 (See FIG. 13) for effecting movement on the piston 114, and thus, the reciprocating lower and upper shafts 110 and 112, between the extended position and the retracted position shown in FIGS. 3 and 4, respectively. As best shown in FIG. 13, the valve arrangement 108 is further connected in electrical communication with the controller 30 for receiving control signals therefrom.

In its assembled state, the lower shaft 110 protrudes into the cavity 84 of the housing 70 and is aligned parallel with the Z-axis, as best shown in FIG. 2. The free end 116 of the shaft 110 is connected to a plunger 118 (See FIG. 3) via a clevis joint 120 for effecting reciprocal movement on the plunger along the Z-axis, as will be described in more detail below. The other end of the actuator 102 is removably connected to the reciprocating block 42 via connector bracket 122 for movement therewith. As such, when the reciprocating block 42 moves between the raised position and the lowered position, the fluid dispensing pump 22 likewise moves between the raised position and the lowered position, as will be described in more detail below.

Figure 3:
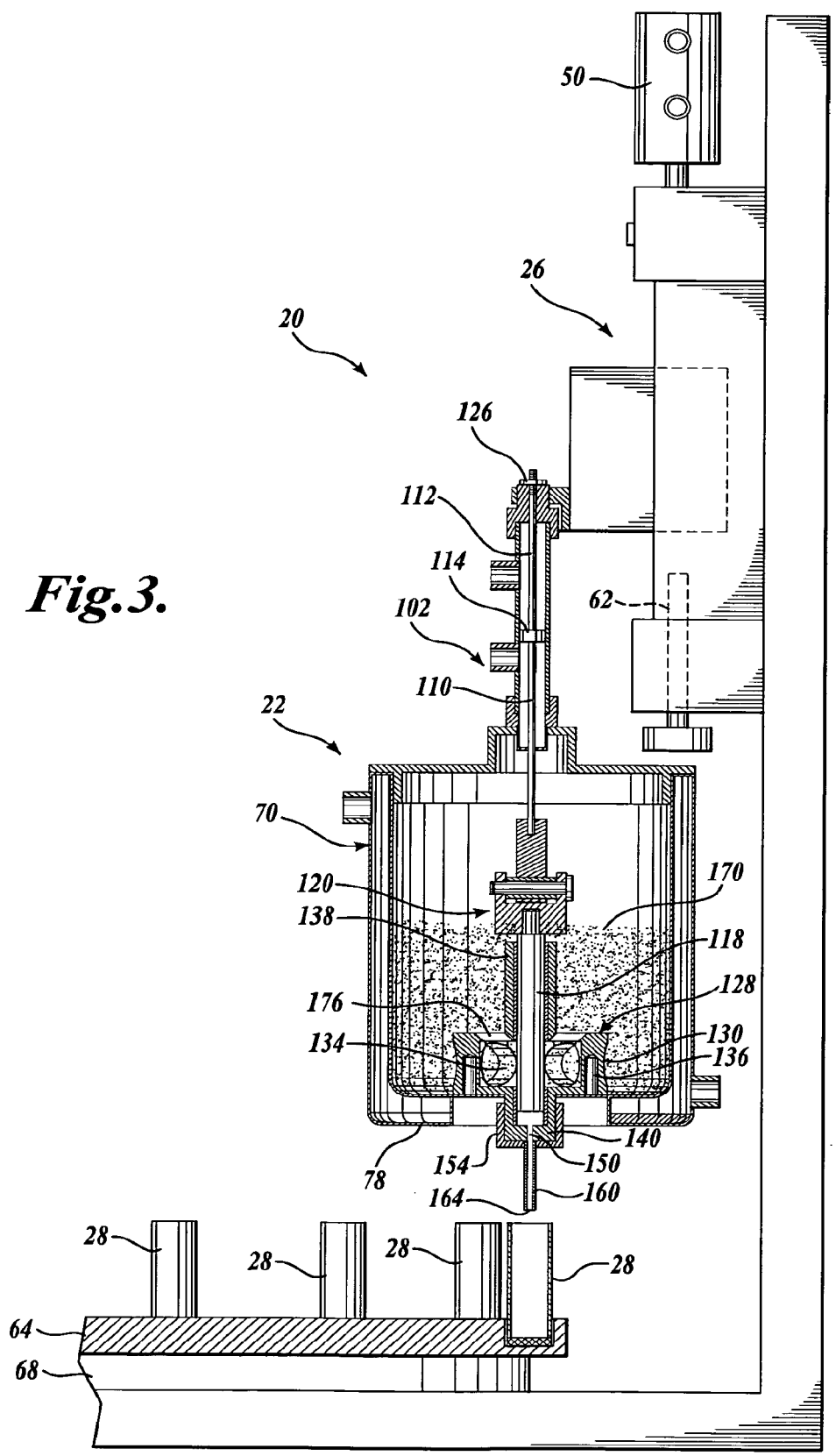
FIG. 3 is a partial cross-section view of the fluid dispensing system shown in FIG. 1, depicting the fluid dispensing pump in the raised position and the plunger in the discharge position.

As best shown in FIGS. 3 and 4, the upper shaft 112 protrudes through the top end of the linear actuator 102 and terminates in a threaded end 124. Threadably attached to the threaded end 124 is a collar 126, such as an internally threaded nut. Accordingly, the position of the collar 126 may be selectively adjusted along the Z-axis. In operation, the selectively adjustable collar 126 functions as a limit stop as the piston 114 moves from the position shown in FIG. 4 to the position shown in FIG. 3. As such, the selectably adjustable position of the collar 126 determines the extended or discharge position of the plunger 118, as will be explained in detail below.

The fluid dispensing pump 22 further includes a plunger casing 128. As best shown in FIG. 2-4, the plunger casing 128 is disposed at the bottom of the cavity 84 and is supported by the bottom wall 78 of the housing 70. The plunger casing 128 includes a cylindrically shaped midsection 130 that defines a main chamber 134. The midsection 130 includes bores that receive upwardly extending studs 136 mounted on the bottom wall 78 for stationarily mounting the plunger casing 128 to the base 74 (See FIG. 2). The plunger casing 128 further includes top and bottom tubular members 138 and 140, which extend from the midsection 130 in a mutually opposing manner. The top extension member 138 guidably receives and supports the plunger 118 within its bore, shown best in FIG. 3. The bottom tubular member 140 defines a metering chamber 146 that is connected in fluid communication with the main chamber 134, and a centrally disposed fluid port 150, as best shown in FIG. 4. The bottom tubular member 140 is sealably received in and protrudes through a centralized opening formed in the bottom wall 78 of the housing 70. A cap 154 is secured to the protruding end of the bottom tubular member 140 and includes an opening to which a discharge tube 160 is fixedly connected in alignment with the Z-axis. The distal end of the discharge tube 160 includes a discharge orifice 164 for discharging fluid. As such, the discharge orifice 164 is connected in fluid communication with the metering chamber 146 via the discharge tube 160 and the fluid port 150.

As was described above, the linear actuator 102 effects reciprocating movement on the plunger 118. As such, the plunger 118 is guidably movable between an extended or discharge position, shown best in FIG. 3, and a retracted position, shown best in FIG. 4. In the retracted position, the collar 126 is not inhibited from movement in the Z direction, and the free end of the plunger 118 is positioned above the interface between the main chamber 134 and the metering chamber 146, and as such, the main chamber 134 is in fluid communication with the metering chamber 146. In the extended or discharge position, the collar 126 is in contact or abutment with the exterior of the actuator 102 and the plunger 118 occupies a portion of the metering chamber 146, and as a result, inhibits fluid communication between the main chamber 134 and the metering chamber 146.

The main chamber 134 of the plunger casing 128 is connected in fluid communication with a source of pressurized fluid, either by gravity or other known methods, such as a pump. In one embodiment and in accordance with another aspect of the present invention, the cavity 84 may be configured to be sufficiently larger than needed for housing the working components of the pump 22. To that end, the excess volume in the cavity 84 may be filled with a fluid 170, such as gametophyte or wax in their liquid state, to form a fluid reservoir. The fluid reservoir is connected in fluid communication with the main chamber 134 through openings 176 formed in the midsection 130 of the plunger casing 128. Thus, when the plunger is in the retracted position, as shown in FIG. 4, fluid 170 is permitted to enter and fill the metering chamber 146.

In one embodiment of the present invention, the fluid dispensing pump 22 may be configured to maintain the temperature of the fluid, thereby inhibiting potential solidification or increased viscosity of the fluid that may hinder the operation of the fluid dispensing pump 22. As best shown in FIG. 2, the side walls 80 of the pump housing 70 may define a contiguous chamber 180, which may either contain insulation or a heated fluid 182. As such, the fluid or insulation filled chamber 180 in the base 74 of the housing 70 forms a jacket that either transfers heat energy to the reservoir for maintaining the temperature of the reservoir at a substantially constant temperature or for increasing the temperature of the fluid reservoir in some embodiments where the fluid 170, such as gametophyte or wax, is added to the cavity 84 at a temperature lower than its preferable operating temperature.

In one embodiment shown best in FIG. 2, inlet and outlet conduits 184 and 188 are connected in fluid communication with the chamber 180. Connected in fluid communication between the inlet and outlet conduits 184 and 188 is a recirculation pump and a heater, both of which are not shown but well known in the art, for recirculating fluid, such as water, under pressure, if necessary, through the jacket at a substantially constant temperature. In embodiments where the fluid is gametophyte, the recirculating fluid is preferably at a temperature in the range of between 38-42 degrees C., and preferably at about 40 degrees C., so that the fluid in the reservoir is maintain between the same range of temperatures. In other embodiments where the fluid is wax, as will be described below, the temperature ranges for the recirculating fluid, and thus, the wax, is in the range of about 90-140 degrees C., and preferably about 135 degrees C.

The operation of the system 20 will now be described in detail with reference to FIGS. 1-10, and 13. FIGS. 1 and 3 illustrate the following: 1) the fluid dispensing pump 22 is in the raised position; 2) the plunger 118 is in the extended or discharge position; and 3) a container 28 is aligned to receive the discharge tube 160 of the fluid dispensing pump 22. The controller 30 then transmits the appropriate signals for effecting movement of the pump 22 by the fluid dispensing pump manipulator 26 from the position shown in FIGS. 3 and 5 to the discharge position shown in FIGS. 4 and 6, wherein the discharge tube is inserted into the container such that the discharge orifice 164 is positioned at the selected level 34, which may be defined as a distance X below the top edge of the container 28 and a distance Y above the bottom surface of the container 28. It will be appreciated that the selected level may be between a range of levels, depending on the type of container 28 and its application.

For example, in the embodiment shown, the fluid dispensing pump manipulator 26 is driven pneumatically by the pneumatic cylinder 50. Accordingly, the controller 30 transmits the appropriate signals to the valve arrangement 60, which results in pressurized air being supplied from the source of pressurized air 58 to the cylinder 50 and air being vented to atmosphere from the cylinder 50. This causes the reciprocating block 42 to translate over the track base 40 to the lowered or down position shown in FIGS. 4 and 6. The reciprocating block translates via the force imparted by the pressurized air supplied to the cylinder 50 until the block 42 abuts the end stop 62. As such, the end stop 62 determines the lowered position of the fluid dispensing pump 22. It will then be appreciated that the end stop 62 may be selectively adjusted to one of many positions, which corresponds to a range of lowered positions, and as a result, a range of selected levels 34.

Figure 6:
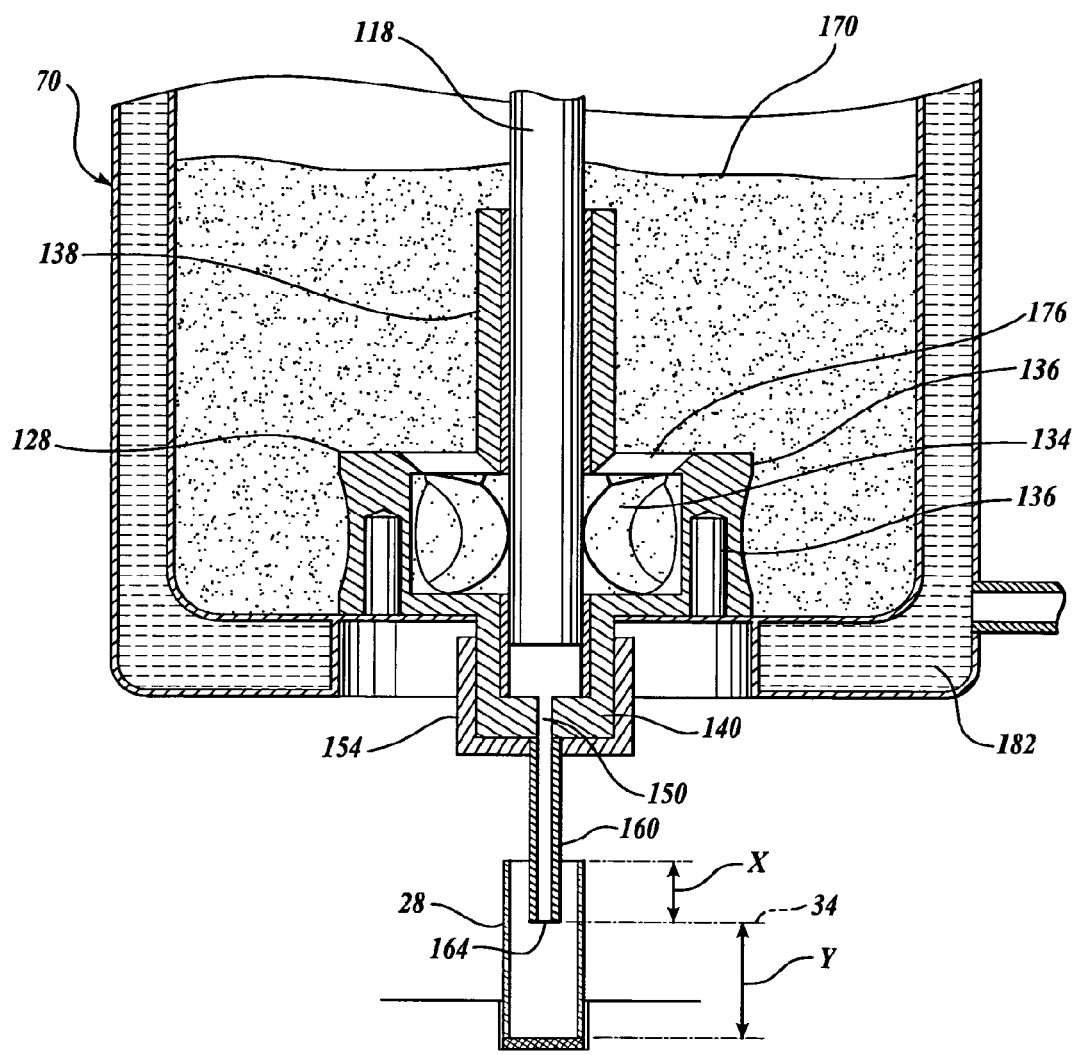
Figure 7:
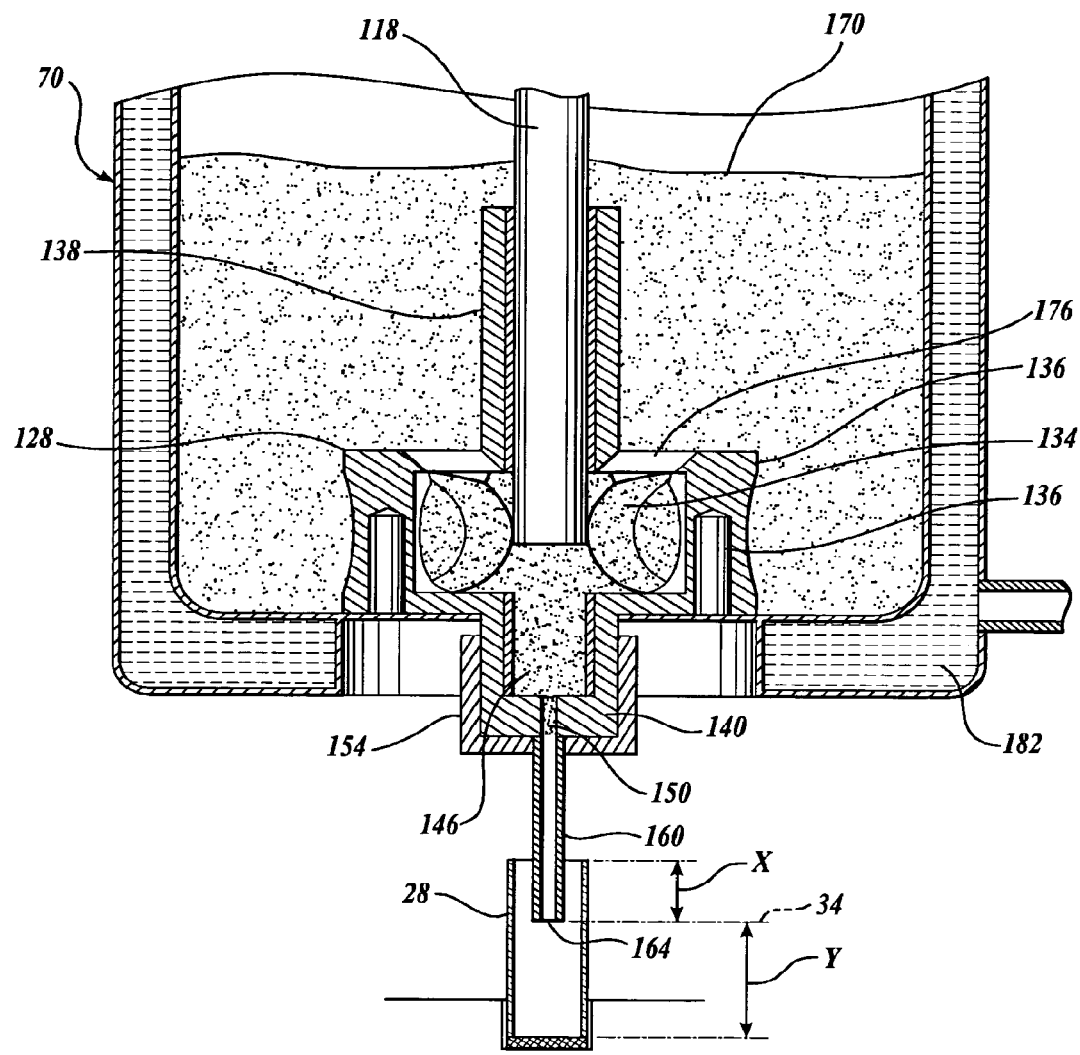

Once the fluid dispensing pump 22 has attained the discharge position shown in FIGS. 4 and 6 such that the discharge orifice 164 is positioned at the selected level 34, the plunger 118 is withdrawn from the discharge position by the linear actuator 102 (See FIG. 4) until the plunger 118 achieves its retracted position, as shown in FIG. 7. As soon as the free end of the plunger 118 withdraws from the metering chamber 146 and into the main chamber 134, fluid 170 occupying the main chamber 134 begins to flow into the metering chamber 146 and partially down the discharge tube 160 due to gravity. In one embodiment, it will be appreciated that the fluid 170 is kept at a sufficient temperature so that its viscosity does not allow for the fluid to exit the discharge orifice 164 absent an abnormal time delay or the actuation of the plunger 118, as will now be explained.

Figure 8:
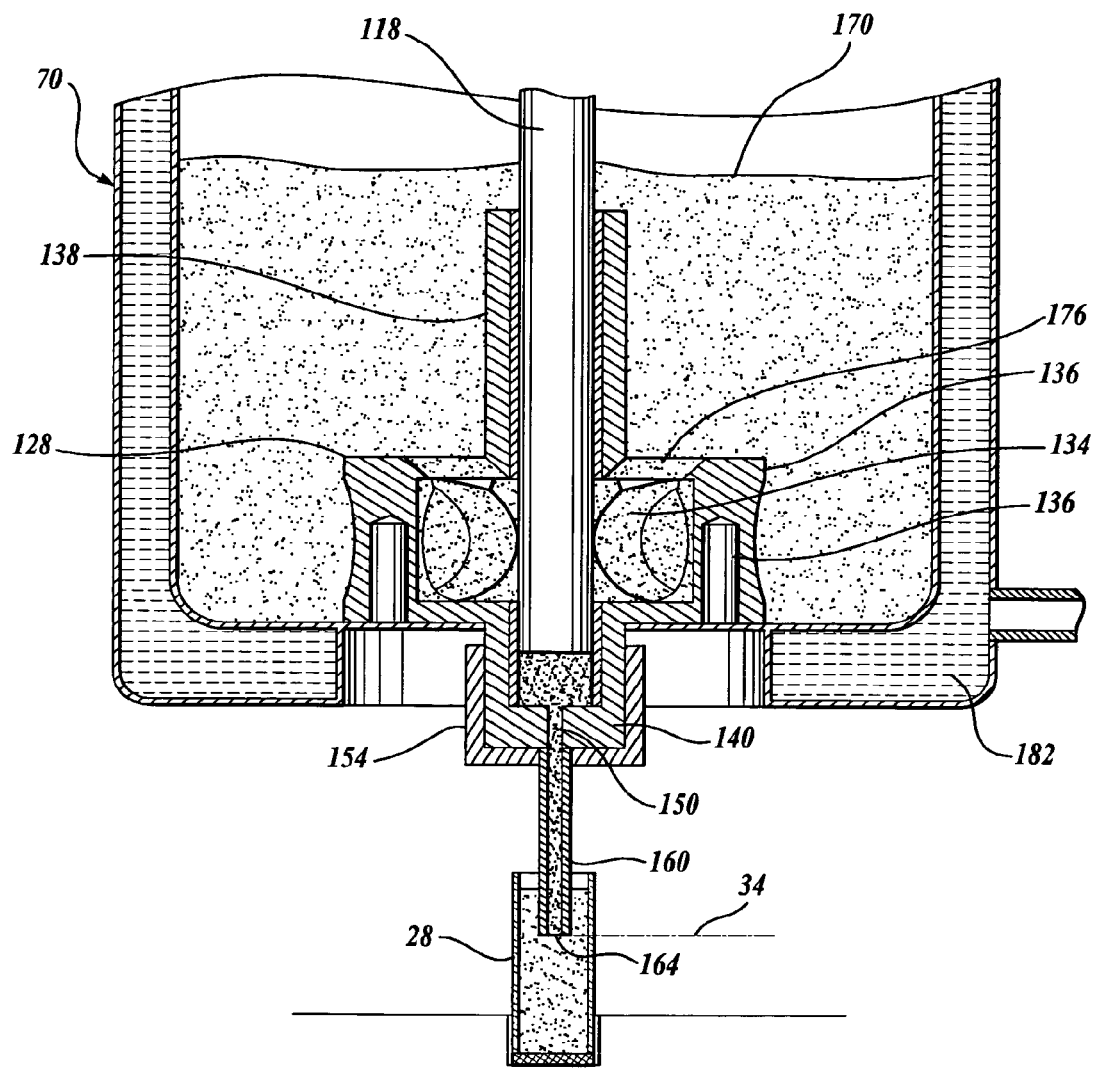

Once the fluid 170 occupies the entire metering chamber 146, the plunger 118 moves downward along the Z-axis to the discharge position shown in FIG. 8 via the linear actuator 102 (See FIG. 3). Specifically, as best shown in FIG. 3, the plunger 118 translates via the force imparted on the piston 114 by the pressurized air supplied to the linear actuator 102 until the collar 126 abuts the housing of the linear actuator. As such, the collar 126 determines the discharge position of the plunger 118. It will be appreciated that the collar 126 may be selectively adjusted to one of many positions, which corresponds to a range of discharge positions, and as a result, a range of fluid discharge quantities, as will be described below.

As the plunger 118 translates downward into the metering chamber 146, the plunger 118 forces the fluid 170 out of the metering chamber 146, through the discharge tube 160, and out of the discharge orifice 164. It will be appreciated that the controller 30 may be programmed to cycle between the plunger retracted position and the plunger extended or discharge position based on the time required for the fluid 170 to occupy the metering chamber 146. This may be easily calculated by knowing the volume of the metering chamber 146 and the flow rate of the fluid 170.

Figure 9:
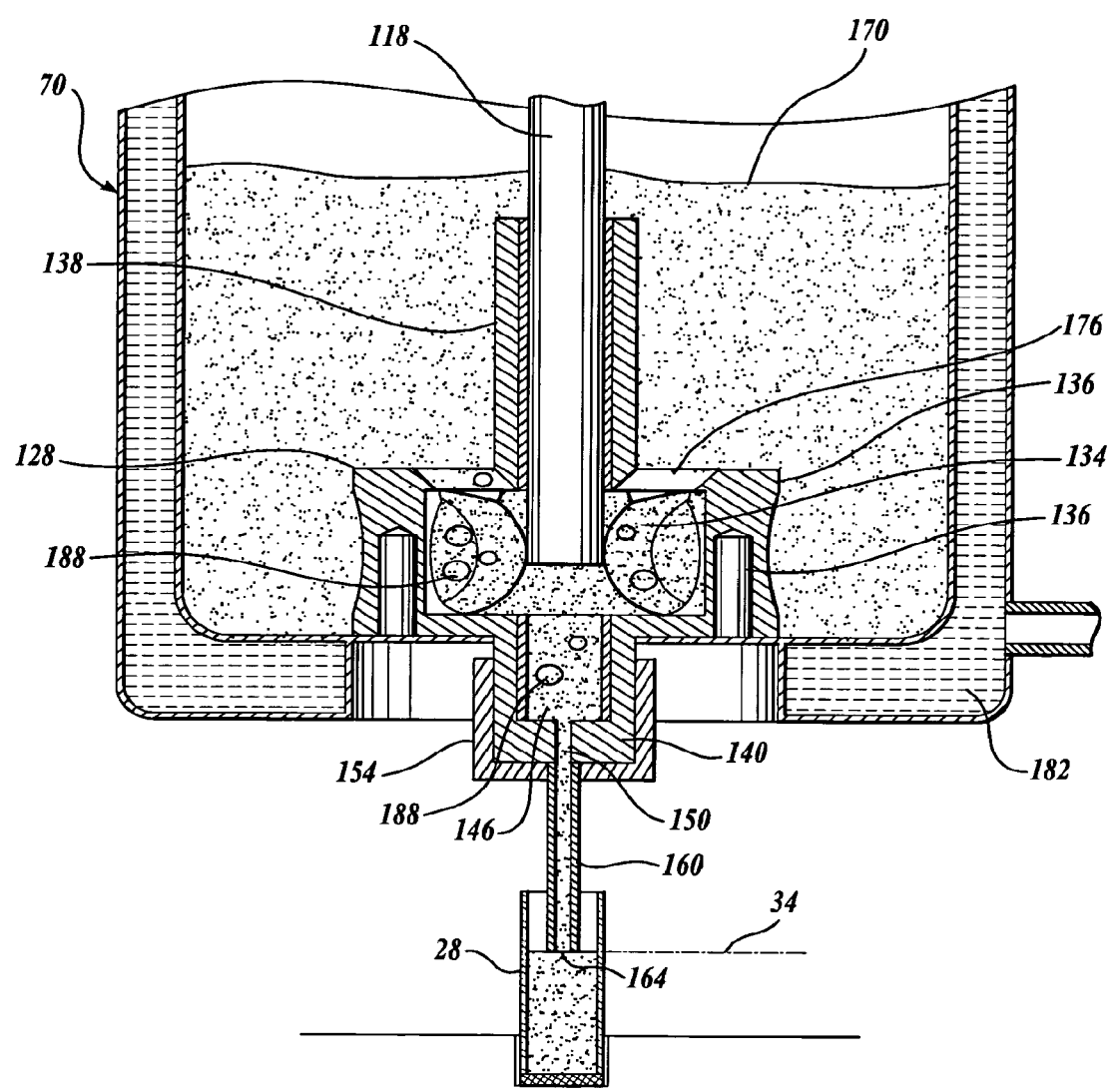

The fluid 170 discharges from the discharge orifice 164 into the container 28. The quantity of fluid discharged from the pump 22 may be specifically determined by the size of the metering chamber 146 and/or the reciprocating distance of the plunger 118. In one embodiment, the metering chamber volume and/or plunger reciprocating distance is selected so that the quantity of fluid discharge therefrom fills the cavity of the container 28 to a level that exceeds the selected level 34 but does not overflow the container opening, as shown in FIG. 8. Subsequent to the discharge of the fluid 170 from the metering chamber 146, the plunger 118 is retracted to the position shown in FIG. 9 by the linear actuator 102 from controls signals transmitted by the controller 30. As the plunger 118 withdraws from the metering chamber 146 to the plunger retracted position, a vacuum pressure is created at the discharge orifice 164 by the sealing engagement between the plunger 118 and the side walls of the metering chamber 146. The vacuum pressure pulls the excess fluid back into the discharge tube 160, and in turn, into the metering chamber 146 until the fluid level in the container 28 lowers to the selected level 34, as shown in FIG. 9. Once the fluid is removed, the discharge orifice 164 is no longer capable of removing more fluid than that associated with the selected level 34 due to the position of the discharge tube 160. Instead of fluid being removed from the container 28 after the fluid level has reached the selected level 34, air 188 is pulled into the discharge tube 160 and metering chamber 146, which will escape into the fluid reservoir once the plunger 118 is retracted past the interface between the metering chamber 146 and the main chamber 134.

Figure 10:
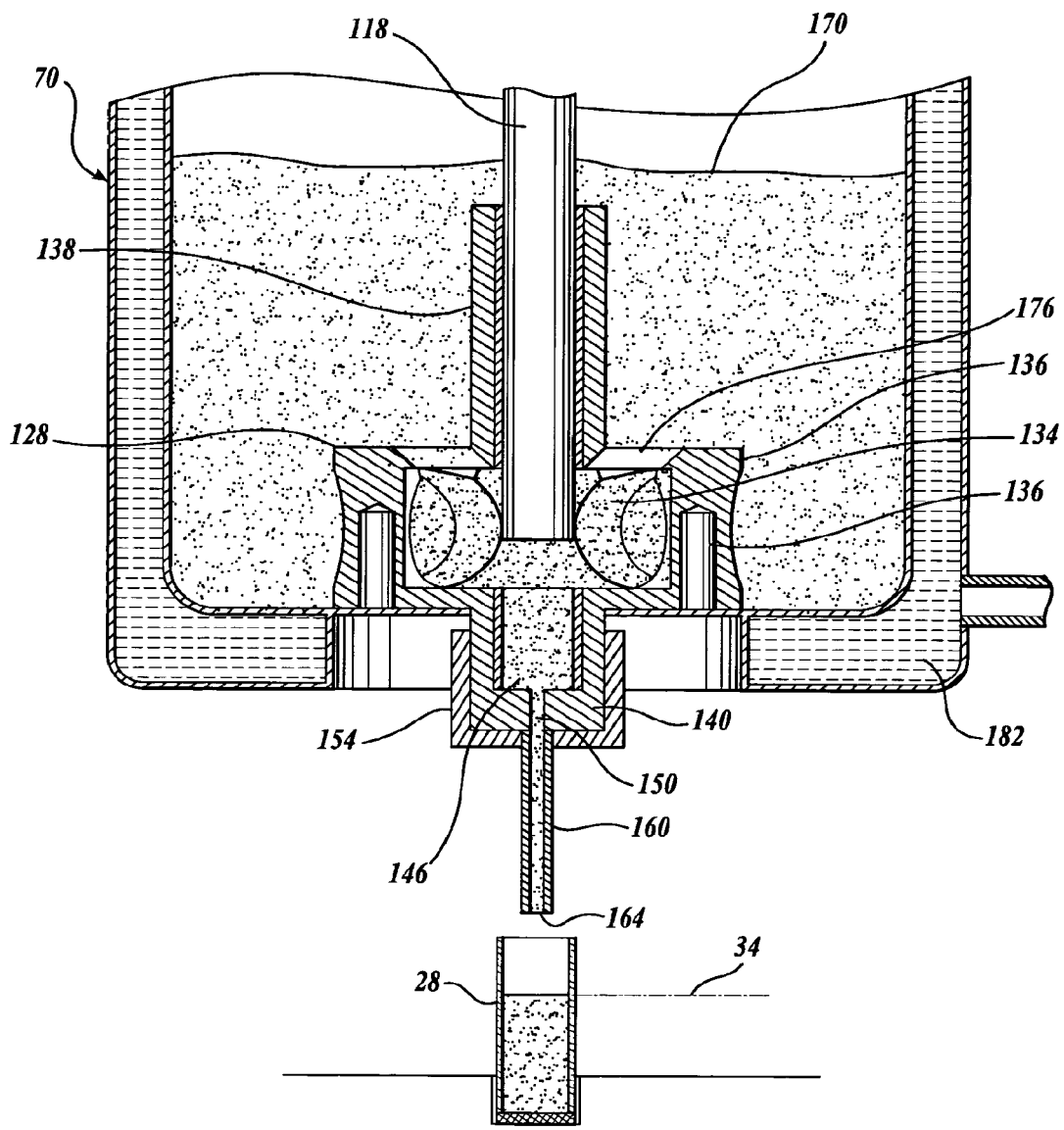

The fluid dispensing pump 22 may then be actuated to the raised position shown in FIG. 10 by the fluid dispensing pump manipulator 26 via controls signals transmitted by the controller 30 so that the discharge tube 160 is withdrawn from the precisely filled container 28. Once in the position shown in FIG. 10, another container 28 may be moved into position, for example, via the operation of the positioning table from control signals transmitted thereto by the controller. As such, the sequence explained above with reference to FIGS. 6-10 may be repeated to sequentially fill a plurality of containers 28.

Figure 11:
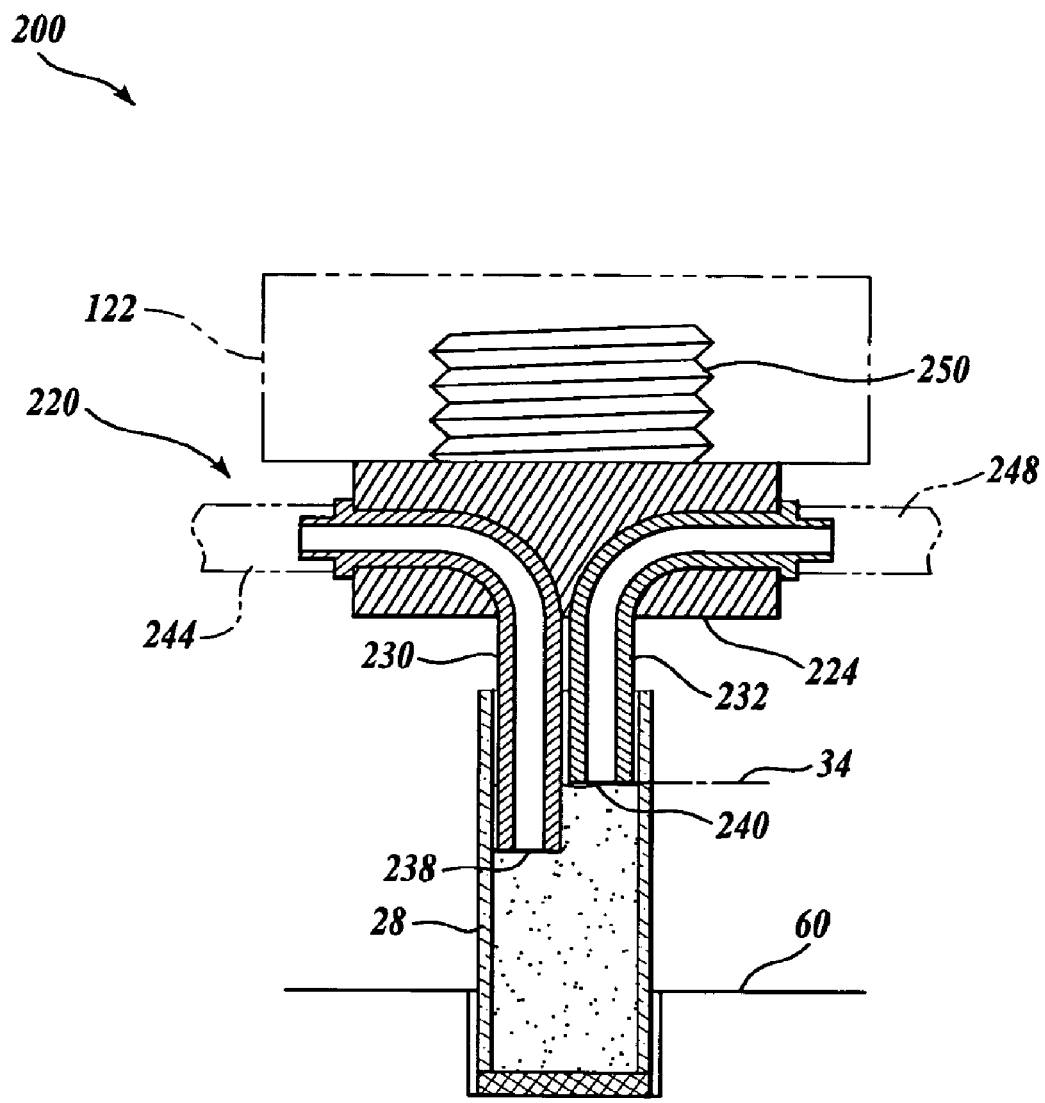
FIG. 11 is a partial perspective view of another embodiment of fluid dispensing system constructed in accordance with aspects of the present invention.

FIG. 11 is a partial perspective view of another embodiment of a fluid dispensing system 200 constructed in accordance with aspects of the present invention. The system 200 is substantially identical in materials, construction, and operation as the system 20 of FIGS. 1-4, except for the differences that will now be explained. As best shown in FIG. 11, the system 200 includes a fluid discharge and vacuum apparatus 220 that replaces the fluid dispensing pump of FIGS. 1-4. The apparatus 220 includes a manifold 224 through which a fluid supply tubing 230 and a vacuum supply tubing 232 are routed. The tubing 230 and 232 terminate in extensions exterior to the manifold 224 and define supply orifice 238 and vacuum orifice 240, respectively. The opposite ends of the tubing 230 and 232 are connected to a source of pressurized fluid, such as gametophyte, and vacuum pressure, through conduits 244 and 248, respectively. The top of the manifold 224 includes a connector fitting 250 for removably connecting the apparatus 220 to the actuator 26 of FIG. 1.

In operation, fluid is dispensed into the container 28 through supply orifice 238 of the tubing 230. Similar to that described above with reference to FIGS. 5-10, fluid is added to exceed the selected level 34. Then, vacuum pressure is supplied to the vacuum orifice 240 of the tubing 232 to remove the excess fluid so that the level of fluid in the container 28 is lowered to the selected level.

Figure 12:
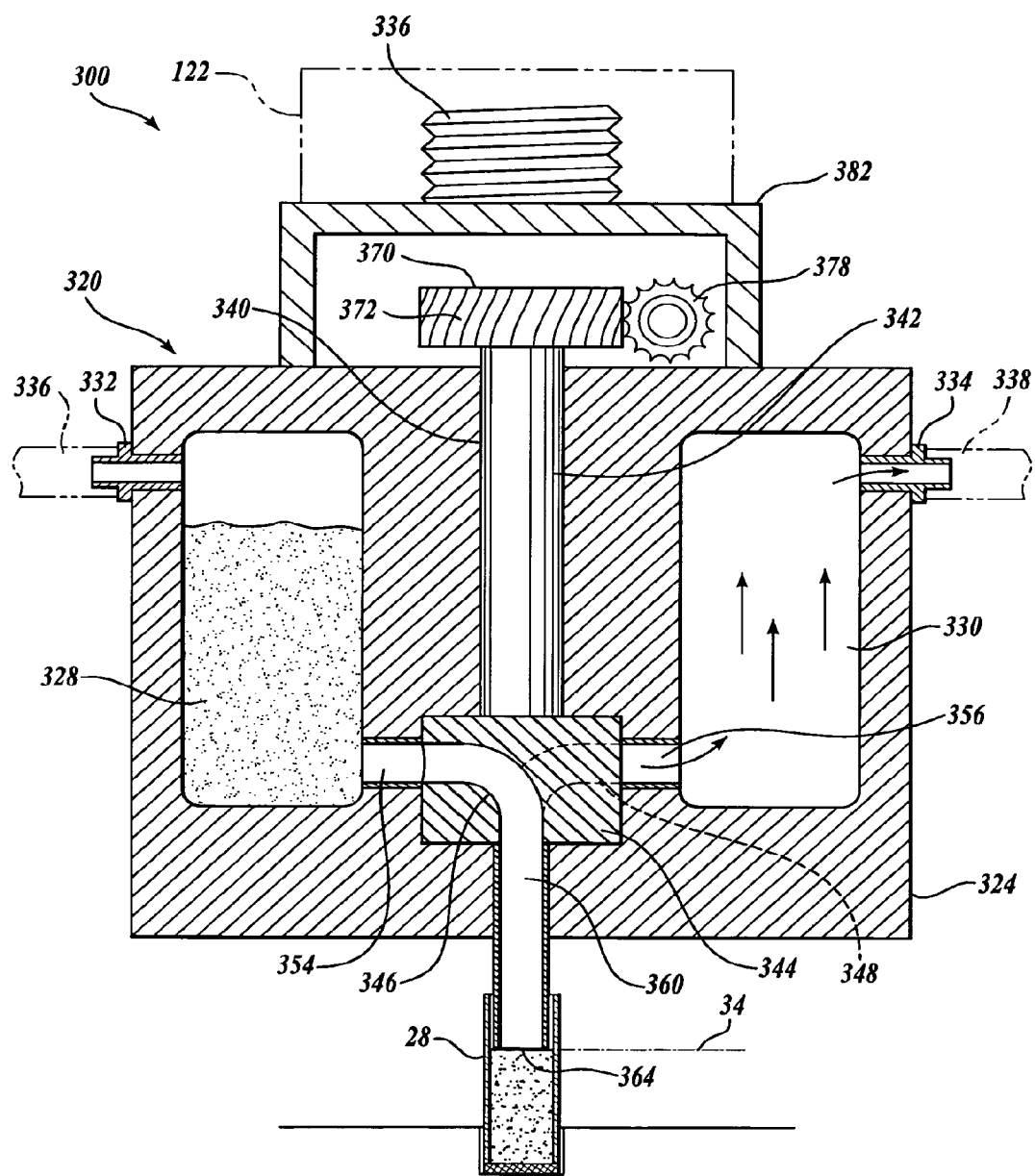
FIG. 12 is another partial perspective view of another embodiment of fluid dispensing system constructed in accordance with aspects of the present invention.

FIG. 12 is a partial perspective view of another embodiment of system 300 constructed in accordance with aspects of the present invention. The system 300 is substantially identical in materials, construction, and operation as the system 20 of FIGS. 1-4, except for the differences that will now be explained. As best shown in FIG. 12, the system 300 includes a fluid discharge and vacuum apparatus 320 that replaces the fluid dispensing pump 22 of FIGS. 1-4. The apparatus 320 includes a manifold 324 that houses a fluid reservoir 328 and a vacuum pressure reservoir 330. Connected to the manifold are pipe fittings 332 and 334 that communicate with the respective reservoirs 328 and 330. Pipe fittings 332 and 334 are connected to an auxiliary source of fluid via conduit 336 and a source of vacuum pressure via conduit 338.

The apparatus further includes a valve body 340 that is rotatably mounted within the manifold 324. The valve body includes a central shaft 342. At one end of the shaft 342, there is a structure 344 having two passageways 346 and 348 that alternatingly interconnect passageways 354 and 356 to a common passageway 360, respectively. Thus, when the passageway 354 is connected to the common passageway 360, the passageway 356 is blocked by the structure, and vice versa. Common passageway 360 terminates into a discharge orifice 364. At the other end of the shaft 342, exterior to the manifold 324, there is a knob 370. The knob 370 is configured with teeth 372 that meshingly engages with the driving worm gear 378 of an electric motor (not shown). As such, when the worm gear 378 rotates, the knob 370 rotates, which in turn, rotates structure 344. The apparatus further includes a mounting structure 382 fixedly connected to the manifold 324. The mounting structure 382 includes a connector fitting 386 for removably connecting the apparatus to the actuator 26 of FIG. 382. The motor may be electronically connected and controlled by the controller 30.

In operation, to dispense a selected level of fluid into the container 28, the electric motor rotates the valve body 340 to a position such that passageway 354 is in fluid communication with the passageway 360. Once the valve body 340 is aligned properly, fluid is dispensed into the container 28. Similar to that described above with reference to FIGS. 5-10, fluid is dispensed to exceed the selected level 34. Then, the electric motor is activated to rotate the valve body 340 to a position such that passageway 356 is in fluid communication with the passageway 360. Once the valve body 340 is aligned properly, vacuum pressure is supplied to the discharge orifice 364 to remove the excess fluid in the container so that the level of fluid in the container 28 is lowered to the selected level 34.

While the preferred embodiments of the invention has been illustrated and described, it will be appreciated that various changes can be made therein without departing from the spirit and scope of the invention. For example, it will be appreciated that the above systems and methods may be easily adapted to supply a desired level of wax to the manufactured seedcoat to seal the plant embryo therein.

The embodiments of the invention in which an exclusive property or privilege is claimed are defined as follows:

1. A method for filling a seedcoat with a fluid to a selected level, the seedcoat defining an open ended cavity, the method comprising:

placing a discharge port of a fluid dispensing device within the open ended cavity at a selected position associated with the selected level, the fluid dispensing device comprising the discharge port, a fluid reservoir in conditional fluid communication with the discharge port, and a vacuum pressure reservoir, separate from the fluid reservoir, in conditional fluid communication with the discharge port, wherein only one of the fluid reservoir and the vacuum pressure reservoir are in fluid communication with the discharge port at one time;

dispensing fluid from the fluid reservoir through the discharge port into the seedcoat to fill the seedcoat with a second level of fluid that exceeds the selected level; and removing a quantity of the fluid from the seedcoat to the vacuum pressure reservoir by the discharge port substantially equal to the amount of the fluid that exceeds the selected level.

2. The method of claim 1, wherein the discharge port comprises a supply orifice in fluid communication with the fluid reservoir and a vacuum orifice in fluid communication with the vacuum pressure reservoir.

3. The method of claim 1, wherein the fluid dispensing device further comprises a shaft in fluid communication with the discharge port at a distal end, in conditional fluid communication with the fluid reservoir, and in conditional fluid communication with the vacuum-pressure reservoir, wherein only one of the fluid reservoir and the vacuum-pressure reservoir are in fluid communication with the shaft at one time.

4. A method for filling a seedcoat with a fluid to a selected level, the seedcoat defining an open ended cavity, the method comprising:

placing a supply orifice of a fluid discharge apparatus within the open ended cavity at a selected position associated with the selected level, the fluid discharge apparatus comprising the supply orifice and a fluid reservoir in fluid communication with the supply orifice through a supply tube;

placing a vacuum orifice of a vacuum apparatus at the selected level, the vacuum apparatus being separate from the fluid discharge apparatus and comprising the vacuum orifice and a vacuum pressure reservoir in fluid communication with the vacuum orifice through a vacuum tube;

dispensing fluid from the fluid reservoir through the supply orifice into the seedcoat to fill the seedcoat with a second level of fluid that exceeds the selected level; and removing a quantity of the fluid from the seedcoat to the vacuum pressure reservoir by the vacuum orifice substantially equal to the amount of the fluid that exceeds the selected level.

5. The method of claim 4, wherein the vacuum tube is both parallel to and adjacent the supply tube at the vacuum orifice.

6. The method of claim 4, wherein the vacuum tube and the supply tube are routed through a manifold, wherein the manifold immobilizes the position of the vacuum tube in relation to the supply tube.

7. A method for filling a seedcoat with a fluid to a selected level, the seedcoat defining an open ended cavity, the method comprising:

placing a discharge port of a fluid dispensing device within the open ended cavity at a selected position associated with the selected level, the fluid dispensing device comprising the discharge port, a fluid reservoir in fluid communication with the discharge port, and a vacuum pressure reservoir, separate from the fluid reservoir, in fluid communication with the discharge port;

wherein the fluid dispensing device further comprises a shaft in fluid communication with the discharge port at a distal end, in conditional fluid communication with the fluid reservoir, and in conditional fluid communication with the vacuum-pressure reservoir, wherein one of the fluid reservoir and the vacuum-pressure reservoir are in fluid communication with the shaft at one time;

dispensing fluid from the fluid reservoir through the discharge port into the seedcoat to fill the seedcoat with a second level of fluid that exceeds the selected level; and removing a quantity of fluid from the seedcoat to the vacuum pressure reservoir by the discharge port substantially equal to the amount of fluid that exceeds the selected level.

* * * * *